March 19, 1946.    R. MESTAS    2,397,032
METHOD AND APPARATUS FOR ANALYZING MOTION OR OTHER PHENOMENA
Filed Feb. 3, 1941    3 Sheets-Sheet 1
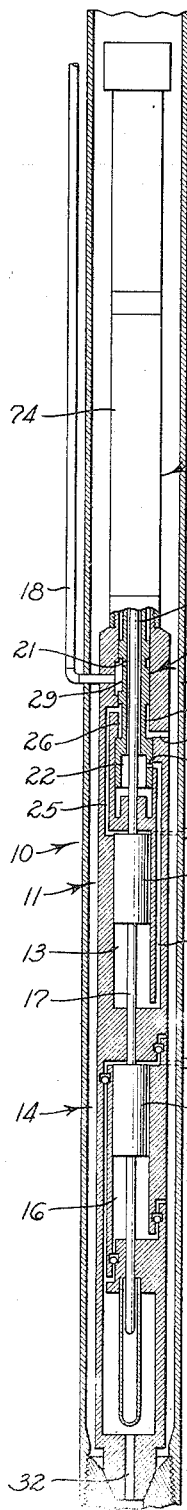
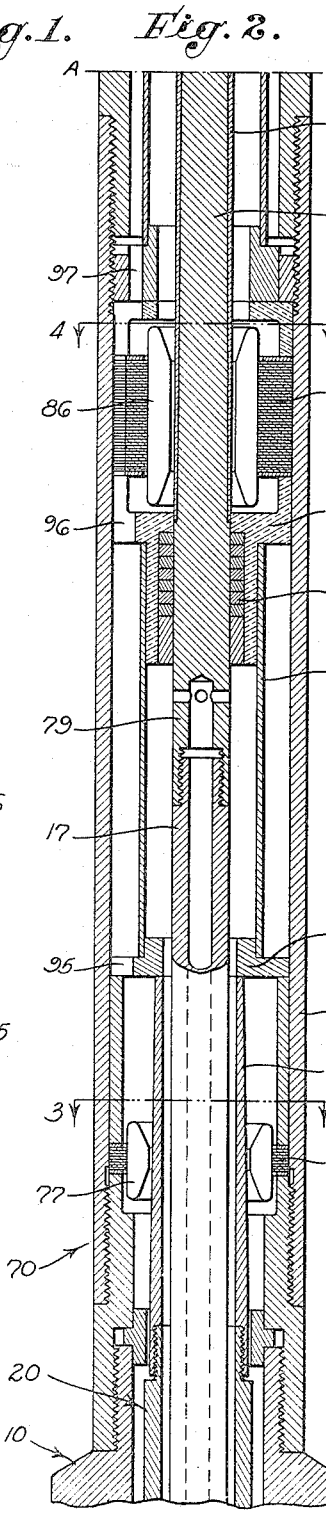
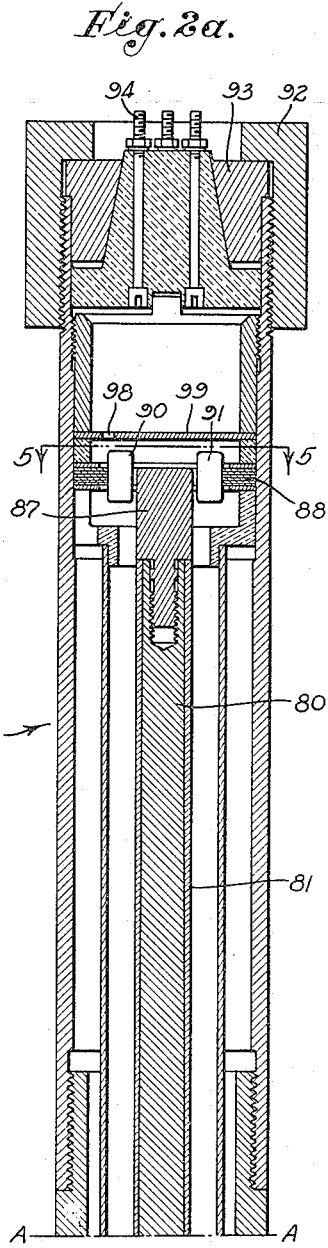
INVENTOR
RICARDO MESTAS
BY
HARRIS, KIECH, FOSTER & HARRIS
Terence F. Kiech
FOR THE FIRM
ATTORNEYS.

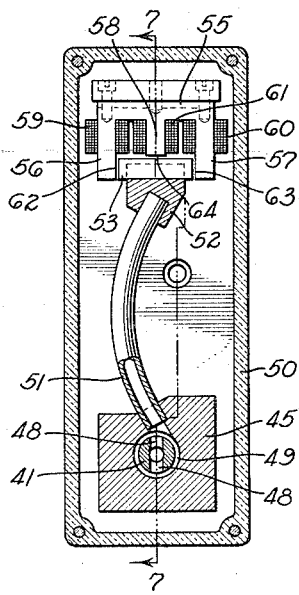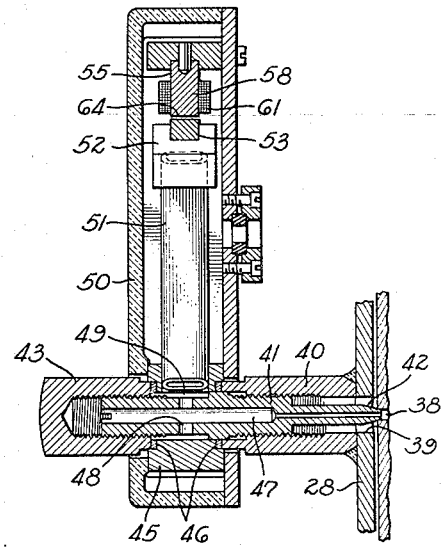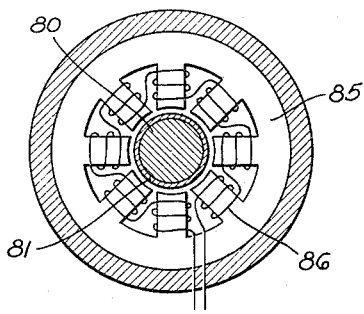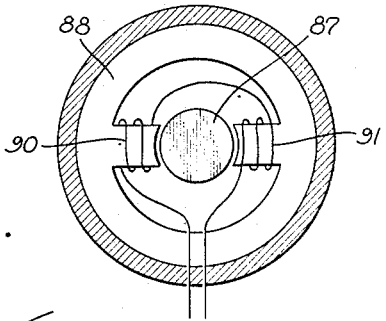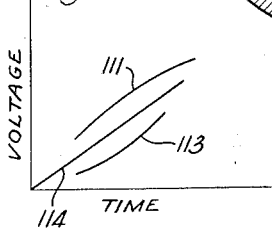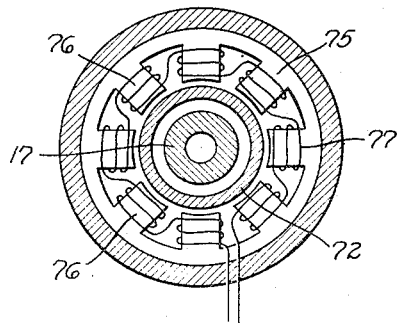

Patented Mar. 19, 1946

2,397,032

UNITED STATES PATENT OFFICE 2,397,032

METHOD AND APPARATUS FOR ANALYZING MOTION OR OTHER PHENOMENA

Ricardo Mestas, Los Angeles, Calif., assignor, by mesne assignments, to Kobe, Inc., Huntington Park, Calif., a corporation of California Application February 3, 1941, Serial No. 377,168

6 Claims. (Cl. 177—351)

My invention relates to the measurement, indication, or analysis of motion or other phenomena and, more particularly, to a novel method and apparatus capable of wide use in determining operating conditions in a mechanism which may be, in whole or in part, in an inaccessible position.

Generally stated, it is an object of the present invention to provide a novel system for indicating, measuring, or analyzing a plurality of dynamic phenomena, by which I have reference to such variables as the motion of an element, a change in physical properties (e. g., a change in pressure or temperature), a change in direction or speed, acceleration of an element or a change in such acceleration, a change in time, etc.

It is another object of the invention to provide a novel method and apparatus whereby an indicating means can be made responsive successively to different dynamic phenomena.

It is also an object of the invention to provide an indicating means movable in a given direction and at right angles with respect thereto, together with means for translating two dynamic phenomena into corresponding electric changes which are simultaneously applied to the indicating means to give an indication thereon of the manner in which one variable changes with respect to the other. For example, the device can be used to indicate the position of an element with respect to pressure, the position of an element with respect to time, etc.

It is another object of the invention to provide a single indicating means in a system permitting successive application thereto of electric variations corresponding to different dynamic phenomena.

In the preferred embodiment of the invention, the indicating means may comprise an electronic beam directed toward a receptive surface and deflectible horizontally and vertically by electromagnetic or electrostatic means. If the horizontal sweep is made responsive to one dynamic phenomenon and the vertical sweep with respect to the other, the spot or point of impingement of the beam on the receptive surface will sweep out a curve. It is an object of the present invention to use such a device in the determination, measurement, or analysis of motion or other dynamic phenomena.

The invention will be described particularly with reference to the determination and analysis of the operation of a piece of equipment, particularly a pump. This pump may provide, for example, a valve mechanism and a piston, and the invention contemplates a system whereby the relative positions thereof at different times can be determined and the motion of one or both can be analyzed for the purpose of checking timing, resonance, phase relationships, transient phenomena, etc. The invention is also applicable to the determination and analysis of other variables of such a mechanism, such as pressure, temperature, etc., and can be made to show these with respect to time, with respect to some other variable, with respect to other temperatures, pressures, etc., or with respect to other existing conditions to the end that the operation of the mechanism can be accurately analyzed.

The invention also contemplates the successive measurement of different variables in a mechanism in such manner as to produce successive curves which serve to show graphically various variables in the mechanism being tested.

Another object of the invention is to provide an indicating means which moves in one direction repeatedly in response to the passage of time, and which moves in another direction in response to different variables.

Another object of the invention is to provide a system including an indicating means responsive to electric variations, together with means for applying these electric variations selectively to the indicating means to move same in different directions. By way of example, the motion of an element can be changed into corresponding electric variations and these can be applied selectively to the horizontal sweep circuit or the vertical sweep circuit of a cathode ray tube.

It should be clear that the illustration of the invention with reference to the analysis of the operating elements and conditions in a pump is only exemplary, this showing being selected as illustrative of the wide application of the invention. The same principles are applicable to the analysis of other machines and the device is particularly adapted to the indication or determination or analysis of conditions which change relatively slowly rather than to ultra-high-speed variations taking place in an interval of $\frac{1}{10}$ of a second or less, though it can be adapted to such use. For example, the device can measure conditions in a reciprocating mechanism where the reciprocative cycle is completed in a period of time ranging from a fraction of a second to several minutes, yet it will be responsive during the reciprocative period to extremely fast transient variations superimposed on the main motion.

The present application is a continuation-in-part of my applications, Serial Nos. 350,939 and 350,940, filed August 3, 1940, to which reference will be made regarding some of the details of the system, as well as different circuits which can be used in the present invention, if desired.

Referring to the drawings, in which the invention is shown in connection with the problem of analyzing motion in a fluid-operated deep well pump:

Figure 1 is a view, partially in cross section, showing the operating mechanism of such a pump, this figure serving as a utility view showing the mode of connection of the analyzer of the invention;

Figures 2 and 2a show, in vertical section, a portion of the analyzer, Figure 2 representing the lower portion and Figure 2a the upper portion, the "break" being indicated by the lines A—A;

Figure 9:
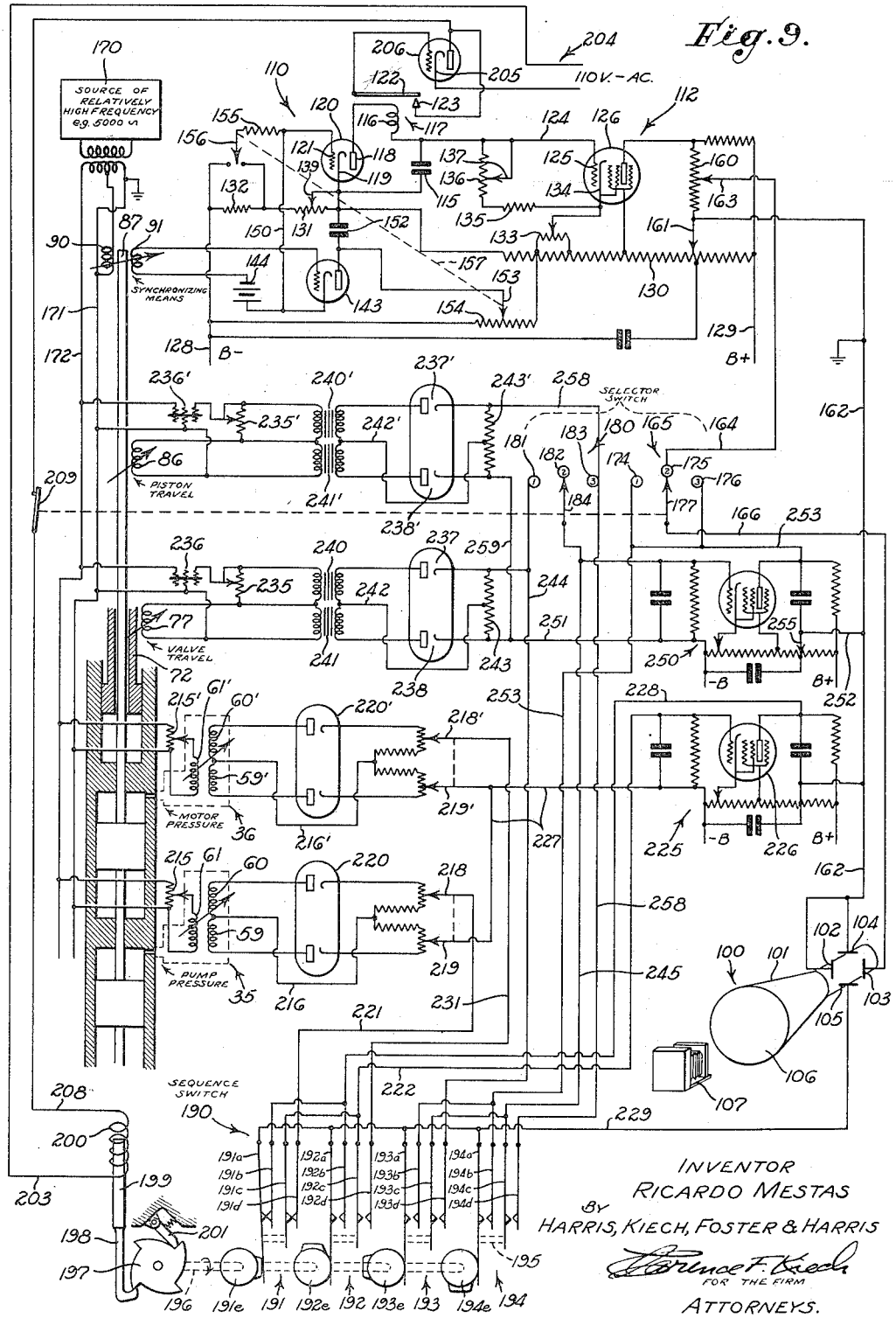

Figures 3, 4, and 5 are horizontal cross-sectional views taken respectively as indicated by the lines 3—3, 4—4, and 5—5 of Figures 2 and 2a;

Figure 6 is a sectional view of the electric pressure gauge used in the invention;

Figure 7 is a sectional view, taken generally as indicated by the line 7—7 of Figure 6;

Figure 8 is a graphical representation of the manner of compensating for non-linearity or non-proportionality in the system; and Figure 9 is a general wiring diagram of the system.

Referring particularly to Figure 1, the invention is shown as applied to the analysis of conditions in a fluid-operated deep well pump, indicated generally by the numeral 10. The operating details of such a pump are known in the art and will not be herein-described in detail except insofar as is necessary to the understanding of the present invention. Such pumps are the subject of numerous patents to which reference is made for additional details, for example, the patent to Clarence J. Coberly, No. 2,081,223.

Essentially, this type of pump may be of the double-acting type and is shown as including a fluid-actuated motor 11 comprising a motor piston 12 reciprocable in a cylinder 13 and operatively connected to a pump 14. This pump includes a pump piston 15 reciprocable in a pump cylinder 16 and interconnected with the motor piston 12 by means shown diagrammatically as a rod 17 extending considerably above the piston 12 and considerably below the piston 15.

The fluid-actuated motor 11 is driven by a stream of high pressure oil delivered through a pipe 18 and the flow thereof to the motor cylinder 13 is controlled by a valve 20 to cause reciprocation of the pistons 12 and 15. The valve 20 is usually in the form of a sleeve and may be actuated by fluid pressure, by means not shown, when the piston 12 is at its extreme upper and lower positions. This valve is in the nature of a slide valve and is shown in its upper position, in which it permits high pressure fluid from the pipe 18 to flow inward through a port 21 downward around the rod 17 into a chamber 22, thence through a port 23 to the lower end of the cylinder 13 through a passage 24. This forces the piston upward and the liquid above the piston is displaced through a passage 25, a valve pocket 26, and a port 27 to the annular space provided between the pump and a tubing 28.

When the piston 12 reaches its maximum desired upper position, the valve 20 is moved hydraulically downward by means not shown, thus permitting a valve pocket 29 to interconnect the pipe 18 and the passage 25 to deliver high pressure fluid to the top of the piston 12. Fluid below this piston is displaced upward through the passage 24, then inward and upward through the valve pocket 26, which is still in communication with the port 27 to permit discharge into the annular space.

As the motor piston 12 reciprocates vertically, the pump piston 15 moves correspondingly, and, by the passages and valves shown, a double-acting pumping action is obtained, the oil from the well being drawn into the structure through a passage 32 and discharged outward through ball-type exhaust valves into the annular passage between the pump and the tubing 28 to mingle with the motor-actuating oil.

The invention includes means which can be made responsive to fluid pressure in various portions of the equipment. For purpose of illustration, an electric pressure gauge 35 is shown as responsive to pump pressure within the cylinder 16 and an electric pressure gauge 36 is shown as responsive to motor pressure within the cylinder 13, both pressures being on the up-side of the corresponding pistons. These electric pressure gauges are shown as positioned outside the tubing 28, though they may be positioned within an annular space between the main body of the pump and the tubing 28, if desired, or at any other convenient position, as they serve to translate pressure variations into corresponding electric variations which are transmitted to the surface of the ground through electric connections not shown in Figure 1.

These electric pressure gauges are of novel construction and are of a construction best shown in Figures 6 and 7. Referring thereto, the main pump body is shown as providing an orifice 38 in alignment with an opening 39 formed through the tubing 28. A sleeve 40 is welded to this tubing and is internally threaded to receive a plug 41, including a forward-extending tube providing a tapered portion 42, fitting into the orifice 38 in fluid-tight relationship. The rear end of the plug 41 is likewise threaded to receive a cap 43. Disposed between the cap 43 and the sleeve 40 is a block 45, there being packing rings 46 concentric with the plug 41, which are compressed against the block 45 when the cap 43 is tightened. Fluid pressure is transmitted through the plug 41 through a passage 47 and side passages 48 to an annular chamber 49 provided by the block 45.

This block is rigidly mounted in a housing 50 and retains the lower end of a Bourdon tube 51 which is closed at its upper end and which communicates at its lower end with the annular chamber 49. This tube is curved in the usual manner, whereby increase in internal pressure will tend to straighten the tube.

The upper end of the Bourdon tube 51 carries a block 52, to which is connected an armature 53 which, as viewed in Figure 6, moves laterally in response to pressure variations. The armature 53 is a part of a magnetic circuit including an E-shaped core 55 rigidly secured to the housing 50 and including end legs 56 and 57 and a shorter central leg 58, respectively surrounded by windings 59, 60, and 61. The core and the armature are formed of magnetic material. They may be suitably laminated or formed of a suitable solid material, or of powdered magnetic material bound together by non-magnetic dielectric material, as is known in the art. The armature 53 is disposed between the legs 56 and 57 to provide air gaps 62 and 63, this armature being spaced from the central leg 58 to provide an air gap 64 of constant size so that its reluctance remains constant.

The winding 61 is energized from a suitable alternating or pulsating source, as will be hereinafter described, and establishes two flux paths, one through the right-hand half of the E-shaped core and including the leg 57, the gap 63, and the gap 64, and another through the left-hand half of the E-shaped core and including the leg 56, the gap 62, and the gap 64. As the armature 53 moves slightly leftward in response to an increased pressure, the reluctance of the latter magnetic path will decrease and the reluctance of the former magnetic path will correspondingly increase, the change in reluctance being due to the change in relative size of the gaps 62 and 63. Correspondingly, the potential induced in the winding 59 will increase and that induced in the winding 60 will decrease. This change in relative potentials can be transmitted to an indicating means at a remote point, as will be hereinafter described, to move the indicating means in response to changes in pressure.

The armature 53 comprises, in effect, a mechanical element, the motion of which is changed in response to changes in pressure. Pressure changes can thus be made to set up corresponding electric changes which are transmitted to a remote point at which the indicating means is positioned and, as will be hereinafter described, these can be amplified or modified. It will be clear that means other than a Bourdon tube can be used to move the armature 53 in response to other dynamic phenomena, such, for example, as by using a thermo-responsive element adapted to move the armature instead of the Bourdon tube shown.

The invention is shown as including a motion analyzer 70, shown generally in Figure 1 and illustrated in detail in Figures 2 and 2a, serving to translate the motion of various mechanical elements into corresponding electric changes which can be transmitted to the indicating means. By way of example, in analyzing the motion of the pump 10, it is often desirable to determine the actual position or change in position of the valve 20. In accomplishing this, the upper end of the valve threadedly receives a tapered sleeve 72 formed of magnetic material and shown in Figure 2 as in its extreme upper position, in which it abuts against a stop ring 73 retained in a casing 74 extending upward from the top of the main pump body.

As best shown in Figure 3, this tapered sleeve reciprocates with reference to a stator 75 and cooperates therewith in defining a magnetic circuit, the reluctance of which changes as the tapered sleeve 72 moves. This stator preferably comprises a multi-pole laminated core built up from punchings or made of suitable solid material, or of powdered magnetic material held together by a binder of non-magnetic dielectric material. It includes essentially a peripheral ring with a plurality of poles 76 extending inward to define a circular space in which the tapered sleeve 72 reciprocates. Pole pieces or shoes may be provided on the inner ends of these poles, if desired, though this is not essential.

A winding 77 is wound around the poles, the manner of mounting being such that alternate poles are of the same polarity so that adjacent poles are of opposite polarity. This winding may be directly or inductively energized from a suitable source of alternating or pulsating potential, and the magnetic circuit is so designed that the flux densities are relatively low so as not to reach the point of saturation.

The flux path is from one pole, across the air gap, through the tapered sleeve 72, through an adjacent air gap, and thence an adjacent pole, returning to the first pole through the peripheral portion of the stator 75. Each of the air gaps is shown exaggerated in Figure 3, as is also the taper of the sleeve 72 shown in Figure 2. In practice, a taper of only a few thousandths of an inch per inch of length is sufficient. It is desirable to have a plurality of poles 76 completely surrounding the tapered sleeve so that minor changes in lateral position of the tapered sleeve 72 with respect to the circular opening provided by the poles will not destroy the accuracy of the indication.

It will be clear that the distance across the gaps will change in response to vertical movement of the tapered sleeve 72. This changes the reluctance of the magnetic path and, correspondingly, the impedance of the winding 77. Correspondingly, the potential across the winding 77, if inductively energized, or the impedance thereof, if directly energized, will set up electric variations corresponding to the motion of the tapered sleeve. In this way, changes in position of this tapered sleeve can be used to set up corresponding electric changes which can be transmitted to the indicating means, either with or without amplification or modification, as will be hereinafter described.

It is also desirable to be able to determine, measure, or analyze piston displacement or motion. This is accomplished, as best shown in Figures 2 and 2a, by detachably connecting to the upper end of the rod 17 an extension 79 including a tapered rod 80, the taper of which is shown somewhat exaggerated for purpose of clarity. In practice, the tapered rod 80 is formed with a very small taper (in the neighborhood of one thousandth of an inch per inch of length), and a sheath 81 formed of relatively non-magnetic material is disposed around the resulting tapered rod 80, preferably by electroplating. I have found it eminently satisfactory to plate on the surface of the tapered rod a relatively thick coating of chromium, after which the external surface is ground to cylindrical form to permit guiding of the extension 79 by a plurality of rings forming a bearing 82 disposed in a head 83 spaced from the ring 73 by a sleeve 84. This bearing means keeps the extension 79 and the tapered rod 80 centered with respect to a stator 85. The chromium is relatively non-magnetic as compared to the magnetic material of which the tapered rod 80 is formed.

The stator 85 surrounds the tapered rod 80, as best shown in Figures 2 and 4, and is shaped substantially the same as the stator 75 previously described. A winding 86 is disposed thereon and can be directly or indirectly energized from a source of alternating or pulsating current. The action of the tapered rod in modifying the flux paths is similar to that previously described with reference to the tapered sleeve 72. As the pistons 12 and 15 and their associated rod 17 move up and down, this reciprocative movement is translated into corresponding electric changes which can be made use of by suitably connecting the winding 86 to a remote indicating means, as will be hereinafter described.

As best shown in Figure 2a, the extreme upper end of the tapered rod 80 carries an armature 87, which is formed of a cylindrical piece of magnetic material. When the pistons 12 and 15, and correspondingly the tapered rod 80, are in an extreme upper position, this armature moves into a circular opening provided by poles of a stator 88, which is generally of the same construction as previously described with reference to the stators 75 and 85 except that only two poles are shown. The left-hand pole is surrounded by a primary winding 90, while a secondary winding 91 surrounds the right-hand pole. The primary winding is energized by any suitable source of alternating or pulsating current, and the magnetic coupling between the windings 90 and 91 is markedly influenced by the position of the armature 87. In fact, it is desired that the magnetic coupling be low so long as the armature 87 is below the stator 88, and that it should increase suddenly to produce a synchronizing impulse when the armature enters the central opening of the stator at the uppermost position of the pistons. At this time, the voltage induced in the secondary winding 91 will suddenly increase and this is used as a part of the synchronizing means of the invention to bring the indicator means to a zero or predetermined position in step with the reciprocations of the pistons.

The extreme upper end of the device is shown closed by an internally-threaded cap 92 holding in place an insulator 93 through which a plurality of terminals 94 extend. These terminals are connected, by wires not shown, to the various windings of the stators 75, 85, and 88, and conductors may extend upward in the well to the electrical equipment, which may be at a remote point. All of the structural details of the device have not been described in detail, but a preferred construction is adequately illustrated in Figures 2 and 2a, this construction permitting ready assembly of the elements and providing for upward passage of conductors to the terminals 94 through various ports or openings inside the casing 74, for example, those indicated at 95 (in the ring 73), 96 and 97 (adjacent the stator 85), and 98 (in a plate 99 above the stator 88), these ports or openings also serving as fluid passages to take care of the fluid displaced by the reciprocation of the extension 79 and the tapered rod 80.

The indicating means is designated generally by the numeral 100 in Figure 9 and is shown as comprising a cathode ray tube 101 of the type sending an electronic beam toward a receptive surface. It will be clear, however, that other types of indicating means can be used and that the indication need not necessarily be visual, though it is preferred that the indicating means be capable of producing a latent or immediately-apparent trace or curve showing the relationships between the various dynamic phenomena. However, separate current-responsive or potential-responsive means can be employed for producing separate indications or traces which can be used later for the plotting of other curves. It is preferred, however, to use an indicating means which is capable of movement in at least two directions, preferably at right angles to each other. If an electronic beam (e. g., a stream of electrons in a cathode ray tube) forms, in whole or in part, the indicating means, this beam can be deflected by means known in the art to move in any given direction, usually in two directions, one tending to sweep the beam horizontally across the receptive surface and the other tending to move the beam to sweep vertically across the receptive surface. The terms "horizontal" and "vertical" are used herein for purpose of clarity but without limitation, for it will be clear that the sweep circuits can be interposed and that the two directions of sweep can be inclined from the horizontal, remaining at substantially right angles to each other, or the angle therebetween can be such that a 90° relationship does not exist. In Figure 9, the horizontal sweep circuit is shown diagrammatically as including plates 102 and 103, serving to displace the electronic beam horizontally, the vertical sweep circuit being shown as including plates 104 and 105, serving to control the vertical deflection of the beam.

The receptive surface against which the electronic beam impinges may include a fluorescent-type screen 106, forming a part of the cathode ray tube 101, in which event the instantaneous position of the electronic beam will appear as a visible spot. Movement of the electronic beam will produce a trace or curve which, if the screen 106 is of the retentive type, may exist for a period of time ranging from a fraction of a second to several minutes. In the embodiment shown, a camera 107 is focused on the screen 106 and contains an appropriate photographic film or plate capable of recording single or successive images or traces produced on the screen 106. The photographic emulsion comprises a receptive surface, and it should be clear that the electronic beam can be made to impinge directly thereon to produce the trace rather than rendering the trace visible through use of an intervening screen 106. When I speak of an electronic beam directed toward a receptive surface, I have reference to either system or to other systems in which the electronic beam, or other indicating means, is capable of producing on a receptive surface a latent or immediately-apparent image which will show the relationships or any of the individual operations or phenomena which the present invention is adapted to indicate or record. Further, it will be clear that the term "indicating means" is not used in a restrictive sense but includes such means as recording means, as previously suggested.

In the illustrated embodiment, the function of the synchronizing means, generally stated, is to maintain the indicating means operating synchronously with respect to the reciprocative movement of the pistons. It is desired, in this embodiment, to be able to move the electronic beam horizontally across the screen 106, starting when the pistons are in their extreme upper position and continuing throughout any desired portion or all of a complete cycle. It is desired, likewise, that the "spot" (formed by the impingement of the electronic beam on the screen 106) should move horizontally in direct proportion to the passage of time (in the use now to be described), or in proportion to some other dynamic phenomena (in other uses to be later described).

If the spot is to move horizontally in response to the passage of time, I prefer to employ a time sweep circuit, indicated generally by the numeral 110. Preferably, this circuit is such as to generate a potential which increases uniformly with the passage of time, this potential being applied to the horizontal-deflection plates 102 and 103. In the preferred embodiment, this time sweep circuit will generate such increasing potentials periodically, even without reference to the synchronizing means provided by the windings 90 and 91. The periodicity should be adjustable, and it is preferred to adjust this so that the normal time between repetition will be in the neighborhood of the number of strokes per minute of the pistons.

The function of the windings 90 and 91 and the armature 87 is, then, to maintain exact synchronization between the starting point of the piston cycle and the point of starting of the horizontal sweep of the spot.

The horizontal sweep circuit 110 builds up the time-related potential applied to the plates 102 and 103 by use of a condenser charged through a resistor, it being known that the charge on such a condenser can be made to build up slowly. The potential applied to the plates 102 and 103 is some function of the potential across such a condenser, as will be described. On the other hand, it is known that the potential across such a condenser does not necessarily increase linearly with time. For example, in Figure 8, curve 111 indicates fragmentally and diagrammatically the general relationship between increase in voltage across the condenser (plotted as ordinates) and time (plotted as abscissa). If this potential were applied directly to the horizontal-displacement plates 102 and 103, the spot would not move in direct proportion to time. While the resulting curves could be later corrected or interpreted, I usually find it desirable to modify the potential delivered to the plates 102 and 103 to correct for the non-linearity of the curve 111. This can be done by use of a suitable ortho-amplifier, indicated generally by the numeral 112 of Figure 9, which is adjustable to provide a characteristic curve which compensates for the non-linear input to produce an output potential (impressed across the horizontal-deflection plates 102 and 103) which varies linearly with time and which follows a straight line in a limited range of the characteristic curve of the amplifier (but over the complete operative range supplied to the indicating device employed). This is suggested in Figure 8 by the straight line 114. Correspondingly, the horizontal movement of the spot will be directly proportional to the passage of time, time being considered, in the present specification, as one of the dynamic phenomena to which the indicating means is to be made responsive.

Referring particularly to the time sweep circuit 110, the condenser, to which reference has previously been made, is indicated by the numeral 115 and is connected in series with a winding 116 of a relay 117 between a plate 118 and a cathode 119 of an electronic tube 120, which may be an 85-type Thyratron tube, such a tube being diagrammatically indicated. The tube 120 comprises the time-base tube and the potential on a grid 121 thereof (controlled synchronously with the piston, as hereinafter described) causes the condenser 115 to discharge periodically through the tube 120 to effect the desired synchronization between the spot and the piston. The "firing" of the tube 120 and the discharge of the condenser 115 therethrough send sufficient current to the winding 116 to momentarily close the normally-open contacts 122 and 123 of the relay 117 for a purpose to be described. The voltage across the condenser 115 thus slowly builds up and suddenly drops, and these voltage changes are transmitted by a conductor 124 to a grid 125 of a vacuum tube 126 forming a part of the ortho-amplifier 112. This tube may be of the 6SK7 type, connected substantially as shown.

The requisite D. C. potentials for the circuit 110 are supplied from a suitable power supply, not shown, this voltage being impressed between the B— conductor 128 and the B+ conductor 129. Connected in series therebetween are resistors 130, 131, and 132, the cathode potential of the tube 126 being adjustable by an auxiliary variable resistor 133 tapped across a portion of the resistor 130. This cathode is connected to the grid 125 through resistors 135 and 136, the latter providing an adjustable arm 137 connected to the conductor 124, whereby a portion thereof can be short-circuited to permit adjustment. The resistor 131 is likewise variable, providing an arm 139.

By adjusting the arm 137, the rate at which the voltage across the condenser 115 builds up can be varied to obtain a periodicity in the neighborhood of the rate of reciprocation of the pistons. The path of current flow, traced from conductor 129, is through resistors 130, 133, 135, and 136 to the condenser 115, and then through resistors 131 and 132 to the conductor 128. When the voltage across the condenser 115 builds up high enough to overcome the bias of the grid 121, the tube 120 fires, the condenser 115 discharging through the tube and relay coil 116.

The variable resistor 133 can be then adjusted to vary the grid bias of the tube 126, and the resistor 131 can be adjusted to correlate the charging curve of the condenser 115 and the output curve of the amplifier so that the resulting curve (suggested by the line 114 of Figure 8 and corresponding to the input delivered to the indicating means), plotted with respect to time, will be a straight line. Once these arms have been thus adjusted, they can remain without further change during the test or, in fact, until the characteristics of the tube 126 change with age. This straight-line relationship can be checked by various means. For example, an evenly-pulsating potential (e. g., that obtained by constantly rotating an arm around a circular rheostat) can be applied to the vertical sweep circuit of the cathode ray tube during the time that the horizontal sweep circuit is energized by the time sweep circuit to cause the spot to sweep out a plurality of sharp-peaked wave forms. If the horizontal distance between corresponding points on all successive wave forms is the same, then the desired linearity will have been obtained.

Exact synchronization with respect to the pump being tested is obtained by making the tube 120 fire at the end of each stroke of the piston or at the end of selected strokes. In doing this, I prefer to use a control tube 143, the grid and cathode of which are connected across the secondary winding 91 of the synchronizing means in series with a C-battery 144 providing a proper bias so as to overcome the small induced potential in the winding 91 due to the small coupling existing between the windings 90 and 91 when the armature 87 is out of the magnetic circuit. The cathode of the tube 143 is connected by a conductor 150 to the grid 121 of the time-base tube 120. Connected to the plate of the tube 143 is an adjustable arm 153 sliding along a resistor 154 connected between the conductor 128 and a tap of the resistor 130.

To the grid 121 of the tube 120 is connected one terminal of a resistor 155 which limits the grid current when the tube 120 fires, the other terminal of this resistor 155 being connected to the arm of a by-pass switch 156. This switch provides two contacts, respectively engaged by the arm when thrown to right or left, the right-hand terminal being connected to the common terminals of the voltage-dividing resistors 131 and 132, the left-hand terminal being common to the conductor 128. If the switch 156 is thrown to the right, the grid bias of the tube 120 is determined by the potential across the non-shorted portion of resistor 131, delivered through the resistor 155. When the switch 156 is thrown to the left, this grid bias is increased by the potential across the resistor 132, delivered to the grid 121 through the switch 156 and the resistor 155. As will be hereinafter described, the grid voltage of the tube 120 is further controlled by the operation of the tube 143. It is preferable to connect the switch 156 mechanically with the arm 153 through a common shaft (as indicated by the dotted line 157) so that one portion of the shaft motion moves the arm of the switch 156 leftward to increase the bias, after which continued shaft motion serves to adjust the arm 153 on the resistor 154.

As previously mentioned, the battery 144 overcomes the slight coupling between the windings 90 and 91 of the synchronizing means when the armature 87 is not disposed between the poles, and no current flows in the plate circuit of the tube 143 at this time. However, when the armature 87 closely couples the windings 90 and 91, this overcomes the bias of the battery 144 and plate current flows through the tube 143. This controls the grid potential on the time-base tube 120 to cause firing thereof. In this connection, the plate current of the tube 143 flows from the conductor 129 through the resistors 139 and 154 to the plate of the tube 143, then to the cathode and through conductor 150 to the resistor 155 whence it can return to the conductor 128 through switch 156, if thrown to the left, or through the resistor 132 if the switch is thrown to the right. Correspondingly, the current flowing through the plate circuit of the tube 143 controls the grid voltage of the tube 120. A synchronizing impulse is thus created when the armature closely couples the windings 90 and 91 as the suddenly-increased plate current of the tube 143 builds up the grid voltage on the tube 120 and causes it to fire.

In adjusting the time-sweep circuit 110 thus far described, the pump may be set into operation while in an accessible or inaccessible position. With the switch 156 thrown to the right, the frequency of the discharge of the condenser 115 may be adjusted by moving the arm 137 as previously described. In the particular system shown, it has been found desirable to make the frequency of discharge of the condenser 115 about the same as the strokes per minute of the pump. The common operative connection between the switch 156 and the arm 153 is then moved so as to first move the switch arm to the left, after which the arm 153 can be adjusted. This motion of the switch 156 increases the grid bias on the tube 120, as previously described, to prevent premature firing of the time-base tube 120 and to permit a variation of about plus or minus 10% in pump speed from the mean value, while maintaining synchronous operation of the indicating means. In other instances, this change in grid bias may be such as to permit a considerably greater speed deviation without destroying synchronous operation of the indicating means.

Later adjustment of the common operative connection between the switch 156 and the arm 153 permits adjustment of this arm with respect to the resistor 154. This adjustment can be made to such a degree that the tube 120 will fire each time the armature 87 is at the top of its stroke after a completed pump cycle, or this adjustment can be made to such a degree that the tube 120 will fire only on the completion of alternate cycles or, in fact, upon completion of a predetermined number of cycles. This is possible because as the charge on the condenser 115 increases with respect to time, a different grid voltage is required to cause the tube 120 to fire. If, for example, the rate of build-up of the voltage on the condenser 115 is quite slow, the grid potential of the tube 120 at the time the armature 87 first couples the windings 90 and 91 may not be sufficient to fire the tube. However, on the succeeding stroke, the potential of the condenser 115 may have built up sufficiently to cause the tube 120 to fire when the armature closely couples the windings 90 and 91 at the end of the second stroke. By appropriate adjustment, the tube 120 can thus be made to fire at the end of each cycle (a situation which will be presumed in the later description), at the end of alternate cycles, or at the end of a predetermined number of cycles. For example, the system can be such that movement of the arm 153 to the right will cause the tube 120 to fire at the end of each cycle, while movement of the arm 153 to the left will cause the tube to fire once every two cycles.

It will be clear from the above that the synchronizing means comprising the windings 90 and 91 and the armature 87 can be used to fire the time-base tube 120 in synchronism with the motion of the pump plunger. However, as soon as the armature starts its downward motion, the voltage on the condenser 115 will begin to build up as a function of time and will continue to build up until the tube 120 again fires. This time-related potential (corrected, if desired, by the ortho-amplifier 112) thus represents a saw-tooth potential which can be applied to the plates 102 and 103 of the cathode ray tube to move the spot horizontally across the screen 106 repeatedly, the spot returning synchronously to the left-hand or starting position when the tube 120 fires.

To operatively connect the output of the ortho-amplifier 112 to the cathode ray tube, a variable resistor 160 is connected between the plate of the tube 126 and an adjustable arm 161 bearing against the resistor 130. Movement of the arm 161 serves to center the spot on the screen 106 or to adjust its vertical position thereon. This arm, after such adjustment, remains set during the test. The arm 161 is connected to the vertical deflection plate 104 and the horizontal deflection plate 102 by a conductor 162, which is preferably grounded as shown. The variable resistor 160 includes an arm 163 which is connected to the horizontal deflection plate 103 through a conductor 164, a selector switch 165, to be later described in detail, and a conductor 166. Shifting of the arm 163 determines the magnitude of travel of the spot on the screen 106 and thus can vary the abscissa scale of the curve to be traced on the screen between successive firing of the tube 120.

It is preferable to use a source of relatively high frequency to energize the winding 90, as well as the windings 77, 86, and 61. The frequency should be sufficiently high to make possible the recording of transient phenomena, and this frequency should be so chosen as to be widely divergent from the frequency of reciprocation of the pistons. Also, it should be sufficiently high that the ultimate indication will be steady. In general, a source frequency of between 500 and 10,000 cycles per second, or higher, will be found satisfactory, the particular system shown having been designed for a frequency of 5000 cycles, the source being generally indicated in Figure 9 by the numeral 170. This source is shown as including an output transformer with conductors 171 and 172 connected thereacross. The winding 90 is shown as being connected between the conductor 171 and a tap of this secondary winding, in which event the voltage across the primary winding 90 will be a fraction of that used in energizing the other windings. The impedance of the fractional portion of the output transformer energizing the winding 90 should preferably be matched in impedance with respect to this winding.

To provide for the selective indication of various dynamic phenomena on the screen 106, I provide the selector switch 165, including contacts 174, 175 (connected to the conductor 164), and 176, together with an arm 177 (connected to the conductor 166) capable of selective engagement with these contacts. A companion selector switch 180 includes contacts 181, 182, and 183, with an arm 184. The arms 177 and 184 are preferably on the same shaft and can assume three positions, indicated respectively as positions Nos. 1, 2, and 3. As will be hereinafter explained, when the selector switches are in position No. 1 (the arms 177 and 184 respectively engaging the contacts 174 and 181), there will appear on the screen 106 a curve representing the relationship between valve motion and pump pressure or motor pressure. When the selector switches are in their No. 2 position, there will appear in sequence on the screen 106 curves with respect to time, indicating piston motion, valve motion, pump pressure, and motor pressure. When the selector switch is in No. 3 position, there will appear on this screen a curve indicating the relationship between piston travel and pump pressure or motor pressure.

To make provision for the showing of either pump pressure or motor pressure as a coordinate of the curves traced on the screen 106, and to provide for the tracing of successive curves of piston travel, valve travel, pump pressure, and motor pressure, I provide a sequence switch, indicated generally by the numeral 190 at the bottom of Figure 9. This sequence switch is formed of four switch banks, indicated generally by the numerals 191 to 194, each switch bank including four contacts, designated by the suffixes a, b, c, and d as shown. For example, the bank 194 includes a contact 194a, shown as extending downward to be engaged by a cam 194e. When the lobe of the cam presses the contact 194a rightward, it electrically connects this contact with contact 194b. This rightward motion is also transmitted by an insulated connection 195 to the contact 194c, moving this rightward until electric contact is made with contact 194d. As soon as the lobe of the cam 194e is moved to its position shown, the contacts will separate as illustrated. The construction of the other switch banks 191, 192, and 193, is identical and corresponding cams 191e, 192e, and 193e operate these banks in an identical manner except that the lobes of these cams are displaced successively 90° from each other. These cams are shown as mounted on a common shaft 196 which, when turned, will close successively the switches of the four banks, beginning with switch bank 191 which, in Figure 9, is shown closed.

The shaft 196 is preferably driven step by step. For example, I have shown diagrammatically a four-toothed ratchet 197 adapted to be turned by a latch 198 providing an armature 199 at its upper end, this armature extending into a winding 200. Each time this winding is energized, the latch 198 will be pulled upward to turn the ratchet 197 through 90° and thus close the banks of switches successively. A spring-actuated follower 201 is disposed to engage successive faces of the teeth of the ratchet 197 to prevent any possibility of reverse motion of the shaft 196 as the latch 198 moves downward when the winding 200 is deenergized preparatory to grasping of the next tooth.

One terminal of the winding 200 is connected by a conductor 203 with a source of potential 204, indicated as a commercial frequency, commercial-voltage line. The other side of this line is connected to a cathode 205 of a triode 206. The other terminal of the winding 200 is connected by conductor 208 and switch 209 with the plate of the triode 206. The switch 209 is preferably on the same shaft as the arms 177 and 184 in such relation that this switch is closed when the arms are in position No. 2 but open when these arms are in positions Nos. 1 and 3.

The grid and plate of the triode 206 are connected respectively to the switch contacts 122 and 123 of the relay 117 to be short-circuited each time the winding 116 of this relay is energized. It will be clear that this short-circuiting occurs instantaneously during the short interval of firing of the time-base tube 120. Correspondingly, at the end of each piston stroke (if the system is thus adjusted), the condenser 115 will be discharged through the relay, the contacts of which short-circuit the grid and plate of the triode to cause it to operate as a two-element rectifier so that the alternating potential of the commercial source is rectified and allowed to pass for a short interval of time through the winding 200 to raise the latch 198 and advance the sequence switch 190 to the next position. It will be clear that when there is no potential on the grid of the triode 206, no current flows from the source 204 through the winding 200, but when the grid and plate are interconnected, rectified current is delivered to this winding of the sequence switch to close successively the contacts of the four banks in step with the reciprocations of the pistons.

In general, it is the purpose of the invention, when selector switches 165 and 180 are in the No. 2 position, to connect the time-base circuit 110 to the horizontal sweep circuit of the cathode ray tube 101 and to apply successive potentials to the vertical sweep circuit of the tube, the first-applied potential varying proportionally with pump pressure, the second-applied potential varying proportionally with motor pressure, the third-applied potential varying proportionally with valve travel, and the fourth-applied potential varying proportionally with piston travel. The sequential connection is obtained by the successive closing of the contacts of switch banks 191, 192, 193, and 194, respectively. Correspondingly, the screen 106 of the cathode ray tube will show curves on successive strokes, each representing the relationship between these four variables (as ordinates) and time (as abscissa).

With this desideratum in mind, a detailed explanation of the remaining circuits will make clear one operative connection which will be found particularly advantageous.

The mode of connection of the electric pressure gauge will be apparent with reference to the lower pressure gauge shown in Figure 9 and responsive to pump pressure. Here, the primary winding 61 can be connected directly between the conductors 171 and 172 to receive the relatively high-frequency potential, though it is preferable to interpose a potentiometer 215, or other voltage-varying means, in the circuit as shown to adjust the amplitude of vertical travel of the spot or other indicating means. The windings 59 and 60 are connected together differentially, the common terminal being connected by conductor 216 to the center of an output resistor in the nature of a double potentiometer providing arms 218 and 219 which are interconnected to move as a unit. The remaining terminals of the windings 59 and 60 are connected to the corresponding ends of the output resistor through two rectifying means, which may be of the dry disc type or of other type. As shown, a vacuum tube means is used in this regard, including a double-element tube 220, which may be a Duodiode of the 6H6 type, connected as indicated (filament circuits here, as elsewhere, being omitted for purpose of clarity).

When the armature 53 of the pressure gauge is in a substantially central position, the potentials produced in windings 59 and 60 will be substantially equal and the voltage drops across the respective halves of the output resistor will be equal so that no current flows through the conductor 216. If, however, the armature is displaced in one direction, the potential across the winding 60 will increase and across the winding 59 will decrease, and the voltage drops across the halves of the output resistor will not be equal, thus changing the potential relationship between the arms 218 and 219 in proportion to the pressure change resulting in this displacement of the armature.

The arm 218 is connected by a conductor 221 to the blade 191d, and if the switch bank 191 is closed, current will flow to the blade 191c (connected common to the blade 192c), and thence through a conductor 222 to the grid or input circuit of an amplifier 225, which may be of conventional construction, as diagrammatically indicated in Figure 9 which shows a single stage of amplification, using a tube of the 6J7 type, for example, indicated by the numeral 226. The remaining terminal of the input circuit of this amplifier is connected by a conductor 227 to the arm 219. After being amplified, the current passes from the plate of this tube through a conductor 228 to the blade 191b (connected in common with the blade 192b). If the switch bank 191 is closed, this current flows through the blade 191a and through a conductor 229 (connected common to all of the blades 191a, 192a, 193a, and 194a) to the vertical-displacement plate 105 of the cathode ray tube. The other vertical-displacement plate 104 is connected through the conductor 162 to the other output terminal of the amplifier 225.

Correspondingly, if the switch bank 191 of the sequence switch 190 is closed, modifications of pump pressure will be changed into corresponding electric changes and delivered through the switch bank 191 to the vertical sweep circuit of the cathode ray tube to cause movement of the electronic beam vertically in proportion to the change in pressure. If, at the same time, this beam is moved horizontally in response to time, the beam or spot will sweep out a curve showing the relationship of pump pressure to time.

It is desirable to be able to adjust the vertical position of the spot formed by impingement of the electronic beam on the screen 106, thus changing, in effect, the base line of the curve swept out. This may be accomplished by the simultaneous movement of the arms 218 and 219.

The mode of connection of the other pressure gauge responsive to motor pressure is similar and need not be explained in detail, being shown in Figure 9 with primed numbers. Suffice it to say that the arm 218' is connected by a conductor 231 to the blade 192d, while the arm 219' is connected to conductor 227. Correspondingly, if the switch bank 192 of the sequence switch 190 is closed, the pressure-dependent potentials between the arms 218' and 219' will be delivered through the switch bank 192 to the input of the amplifier 225, the output thereof being connected through the switch bank 192 to the vertical-displacement plates 105 and 104, as previously indicated. Correspondingly, when the switch bank 192 is closed, the electronic beam will be deflected vertically in proportion to the pressure variations in the motor cylinder and a curve, giving the relationship between this pressure and time, will be swept out on the screen 106.

Referring now to the circuit responsive to valve travel, the winding 77 is shown as connected in series with a variable impedance 235 to receive the potential of the source 170. Preferably, this potential is made variable by a T-pad resistor 236, or other variable resistance means, a T-pad resistor being preferable as it will maintain substantially constant input and output impedance, regardless of the setting thereof, this device serving to control the amplitude of the valve-travel trace. The variable impedance 235 may be a variable inductance or, as shown, a variable resistor, the arm thereof being connected to one end of the resistance. Correspondingly, the voltage derived from the source 170 is divided between the winding 77 and the impedance 236, the impedance of the latter being of the same order as that of the winding 77 so that the current and voltage in the two portions of the output circuit (to which the winding 77 and the impedance 235 are respectively connected, as will be described) will have substantially the same potential relationship. In some instances, I prefer to inductively energize the winding 77, as by winding a primary winding on the poles 76, the winding 77 then being the secondary winding and being connected as shown in Figure 9.

The output circuit connected to the winding 77 and the variable impedance 235 preferably includes two rectifiers associated with the respective halves of the circuit, and indicated generally by the numerals 237 and 238. These rectifiers may be of any suitable type, for example copper oxide rectifiers can be used, or rectification can be obtained by use of vacuum tubes. The rectifiers can be directly across the respective halves of the circuit, in which event it is best to have the impedances of each half match that of its corresponding rectifier. However, I prefer to interpose transformers 240 and 241 therebetween, the secondary windings of these transformers respectively matching the impedances of the rectifiers 237 and 238. The primary windings are connected as shown, respectively across the variable impedance 235 and the winding 77. It is usually desirable that the transformers 240 and 241 provide cores of magnetic material and, in this event, these cores should be separate rather than common to the two transformers.

The common terminal of the secondary windings of these transformers is connected by a conductor 242 to a center tap of an output resistor 243, the end terminals of which are connected to the rectifiers. Vacuum tube rectification is diagrammatically shown in Figure 9 as, for example, by use of a tube of the 6H6 type providing dual rectification, the output being fed to the terminals of the output resistor 243. The upper terminal of this resistor is shown as connected to a conductor 244 extending to the contact 181 of the selector switch 180 and to the blade 193d of the switch bank 193. If the switch bank 193 is closed, current can then flow to the blade 193c (connected common to the blade 194c), flowing through a conductor 245 (which is also connected to the arm 184 of the selector switch 180) to the grid circuit of an amplifier 250. The other input terminal of this amplifier is connected by a conductor 251 directly to the remaining (lower) terminal of the output resistor 243. Correspondingly, if the switch bank 193 is closed, the electric changes corresponding to valve travel, and which appear across the output resistor 243, will be delivered to the input of the amplifier 250. One of the output terminals of this amplifier is connected by a conductor 252 to the conductor 162, and the other output terminal is connected by a conductor 253 providing branches leading to the contacts 174 and 175 of the selector switch 165 and to the blade 193b (connected common to the blade 194b). If the switch bank 193 is closed, this output current flows from the blade 193b through the blade 193a, and through the conductor 229 to the vertical-displacement plate 105 of the cathode ray tube. Correspondingly, if the time sweep circuit 110 is in operation and the switch bank 193 is closed, there will be produced on the screen 106 a trace representing valve travel (as ordinates) and time (as abscissa).

It is preferred to use an ortho-amplifier 250 to compensate for any non-linearity or non-proportionality of the input voltage with respect to movement of the tapered sleeve 72, representing valve motion. In some instances, the potential across the output resistor 243 will not vary exactly proportionally with piston displacement, yet it is usually desirable to deliver to the cathode ray tube a potential which varies substantially linearly or proportionally with the movement of the tapered sleeve 72 unless the resulting trace or curve on the screen 106 is interpreted with this in mind. While linear or proportional potentials can be produced across the output resistor 243 by changing the design of the taper of the sleeve 72, I find it preferable to make what compensations are desired by use of the ortho-amplifier 250.

This can be done by using an ortho-amplifier having a characteristic curve which effects the compensation for the non-linear or non-proportional potentials reflected across the output resistor 243. This correction can be explained generally by reference to Figure 8 if the straight line 114 is considered as representing the desired linearly-varying potential to be applied to the vertical sweep circuit of the cathode ray tube. The curve 111 with different coordinates may be considered as representative of the non-linear input to the amplifier, though it should be understood that the showing is exaggerated to some extent and is made without attempt to plot actual values. If the characteristic curve of the amplifier is represented in part by the curve 113 (also with different coordinates), the output will be substantially linear, as suggested by the straight line 114. In other words, by proper selection and control of the amplifier, a characteristic curve can be obtained which compensates for the non-linear nature of the input. It will be understood that, while it may not be feasible to compensate accurately over the entire range of input and output of the amplifier, it is possible to do this over a more limited range of amplifier operation, but sufficient to take care of the full operative range of the indicating means to give the desired compensation.

In adjusting preliminarily the electric system responsive to valve travel, the following procedure can be used. With no input from the source 170, the spot may be adjusted to coincide with a selected base line on the screen 106 by adjustment of the tapped-off potential applied to the vertical-displacement plate 104 through the conductor 252 by moving an arm 255. The input can then be connected and the amplifier appropriately adjusted until the spot moves vertically in direct proportion with movement of the valve. This proportionality can be checked by displacing the valve different amounts and measuring the displacement of the spot from the selected base line. The valve can then be moved to its central or mean position while the pump is accessible for measurement of valve position. The variable impedance 235 is then adjusted to bring the spot to coincide with the selected base line, if it is not already there, and subsequent variations in potential from the source 170 will not shift the spot from this base line (though they may change the amplitude of motion of the spot, thus making it desirable to use a constant-voltage source). In general, the desired amplitude of vertical motion of the spot is obtained by adjusting the T-pad 236, as previously described. Thus adjusted, the pump can be installed in an inaccessible position and the spot will move vertically with respect to the screen 106 in a manner which is proportional to valve travel.

Regarding the circuit for indicating piston travel, the general elements of the circuit are the same as just described with reference to the valve travel circuit, and primed numerals have been employed to indicate the relationship. Suffice it to say that one terminal of the corresponding output resistor 243' is connected by a conductor 258 to the contact 183 of the selector switch 180 and to the blade 194d of the switch bank 194. If this bank is closed, current can flow to the blade 194c and thence through the conductor 245 to the input of the amplifier 250, as previously described. The remaining terminal of the output resistor 243' is connected to the conductor 251 by a conductor 259 so as to be common to the corresponding terminal of the output resistor 243.

Correspondingly, if the switch bank 194 is closed and the time sweep circuit 110 is in operation, electric changes corresponding to piston travel will be applied across the input of the amplifier 250. The output of the amplifier will be fed through conductor 253, blades 194b and 194a, and conductor 229 to the vertical-displacement plate 105. At this time, the spot will trace on the screen 106 a curve of piston travel (as ordinates) and time (as abscissa).

It will be clear that the circuits responsive to pressure variations and valve and piston travel are diagrammatically shown, and that various changes can be made therein without departing from the spirit of the invention. Various alternatives to these circuits are disclosed in my applications supra, which contain also a more detailed explanation of the operation and the method of adjustments of similar circuits.

It will be apparent from the foregoing that, if the selector switches 180 and 165 are in their No. 2 position (at which the time switch 209 is closed), the time sweep circuit will move the spot horizontally across the screen 106 successively, the start of each horizontal displacement being exactly in synchronism with the start of a piston cycle. During the first horizontal sweep, vertical displacements of the spot will be in proportion to pump pressure, the switch bank 191 being closed. During the second horizontal sweep, all of the switch banks will be open except the bank 192, and vertical displacements will be in proportion to motor pressure. During the third horizontal sweep, all of the switch banks will be open except the bank 193, and vertical displacements will be in proportion to valve travel. During the fourth horizontal sweep (completing the cycle), all of the switch banks will be open except the bank 194, and vertical displacements will be in proportion to piston travel. The successive curves traced on the screen 106 can be photographed, directly or indirectly, or if visual observation alone is desired, a screen 106 of the retentive type can be used to make the curves persist until re-traced by the spot. Correspondingly, four superimposed curves can be obtained on the screen 106, each with the same base line and, from these curves, operating conditions in the pump can be accurately ascertained.

If the selector switches 180 and 165 are moved to their No. 1 positions, this will open the switch 209 to render inoperative the sequence switch 190. However, the sequence switch can be stopped with any one of the switch banks closed, or it can be manually turned to close the switches of any particular bank. By throwing selector switches 180 and 165 to their No. 1 position, it is possible to obtain a trace on the screen 106 of the valve motion (as abscissa) and either pump pressure or motor pressure (as ordinates), depending upon whether switch bank 191 or 192 is closed. Assuming that a curve of valve motion with respect to motor pressure is desired, the switch bank 192 will be closed and the circuits can be traced as follows.

The output from the valve-travel output-resistor 243 is delivered to the input of the amplifier 260, one side of the circuit being through the conductor 251 and the other side of the circuit being through conductor 244, contact 181 of the selector switch 180, and arm 184 to the grid circuit of the amplifier 250. The output potential from the amplifier will be delivered on one side through conductors 252 and 162 to the horizontal-deflection plate 102. On the other side, this output is delivered through conductor 253, contact 174, arm 177, and conductor 166 to the horizontal-deflection plate 103. As switch banks 193 and 194 are opened, neither the input not output currents flow therethrough. This will cause horizontal displacement of the spot (as distinct from the vertical displacement described with reference to the sequential operation) to move the spot horizontally in proportion to valve travel.

The output from the circuit responsive to motor pressure is delivered, on one side, directly to the input of the amplifier 225 through the conductor 227. On the other side, this output is delivered through the conductor 231, blades 192d and 192c, and conductor 222 to the grid circuit of the amplifier 225. One leg of the output circuit of this amplifier is connected to the vertical-displacement plate 104 through the conductor 162. The other leg of the output circuit conducts current through the conductor 228, the blades 192b and 192a, and the conductor 229 to the remaining vertical-displacement plate 105. Correspondingly, the spot will move vertically in response to changes in motor pressure, and the position of a point on the resulting curve will show the instantaneous relationship between valve travel and motor pressure.

If selector switches 180 and 165 are moved to their No. 3 position, the switch 209 will likewise be open to render inoperative the sequential operation of the sequence switch 190. At this time, a curve can be obtained on the screen 106 showing the relationship between piston travel (as abscissa) and pump pressure or motor pressure (as ordinates), depending upon whether the switch bank 191 or 192 is closed. Assuming that the relationship between piston travel and pump pressure is desired, the operator will close the switch bank 191 and the circuits can be traced as follows. The output produced by piston displacements will be transmitted to the amplifier 250, one half of the circuit including conductors 259 and 251 and the other half of the circuit including conductor 258, contact 183, arm 184, and that portion of the conductor 245 which extends to the grid circuit. The output of this amplifier will be delivered on one side through conductors 252 and 162 to the horizontal-displacement plate 102, and on the other side through conductors 253, contact 176, arm 177, and conductor 166 to the horizontal-displacement plate 103.

The electric variations corresponding to pump pressure will be delivered, on one side, through conductor 227 to the amplifier 225 and, on the other side, through conductor 221, blades 191d and 191c, and conductor 222 to the grid circuit of the amplifier. The output of the amplifier is delivered, on one side, directly to the conductor 162 and thence to the vertical-displacement plate 104 and, on the other side, through the conductor 228, blades 191b and 191a, and conductor 229 to the vertical-displacement plate 105.

It will be clear that the invention is applicable to the recording of various dynamic phenomena, the present showing being exemplary of its versatility. By use of the system, various phenomena can be indicated individually or successively with respect to time or with respect to other variables, and the relationship between one dynamic phenomenon and another can be shown either instantaneously or as a curve. Furthermore, the system provides for a mode of connection in which electric changes corresponding to a given dynamic phenomenon can be applied to the indicating means, such as the beam of a cathode ray tube, so as to deflect this selectively in either a horizontal or a vertical direction. This is exemplified, for example, by valve travel which can be shown as abscissa (when the selector switches are in No. 1 position) or as ordinates (when the selector switches are in No. 2 position).

Various changes and modifications can be made without departing from the spirit of the invention which, for the purpose of ready understanding, has been simplified in the foregoing description and in the appended drawings, but which has been described in sufficient detail to make apparent to those skilled in the art the mode of operation and other uses and modifications.

I claim as my invention:

1. In a device for indicating or analyzing changes in a dynamic phenomenon, the combination of: an electric indicating means providing movable means movable in a given direction and at right angles with respect to said given direction; operating means for delivering to said indicating means electric variations corresponding to said changes in said dynamic phenomenon; switch means associated with said operating means for selectively delivering said electric variations to said indicating means to move said movable means selectively in said given direction and at right angles with respect thereto; and means for delivering to said electric indicating means simultaneously with such delivery of electric variations to move said movable means in a direction at right angles to the direction in which said first-named electric variations tend to move said movable means whereby, for example, said movable means can trace successive curves in which the ordinates and abscissa are selectively used for indicating said changes.

2. In a device for indicating or measuring two cyclically-occurring phenomena, the combination of: a first means for translating one of said phenomena into a corresponding electric variation; a second means for translating the other of said phenomena into a corresponding electric variation; electronic means providing an electronic beam directed toward a receptive surface and including a pair of circuits adapted upon respective energization to deflect said beam in directions at right angles to each other; sweep means connected to one of said circuits for repeatedly sweeping said electronic beam across said receptive surface in one of said directions; a sequence switch means for alternately applying said electric variations to the other of said circuits to deflect successive sweeps of said beam in the other of said directions to produce traces representing said two cyclically-occurring phenomena as one and the same coordinate; and a selector switch means for disconnecting said sweep means from said one of said circuits and connecting said first means thereto to sweep said beam in said one direction in response to changes in said first phenomena while retaining the application to said other of said circuits of said electric variation corresponding to said second phenomena to sweep out a curve, each coordinate of which represents one of said phenomena to indicate variations in one of said phenomena with respect to the other.

3. In a device for indicating or measuring a plurality of cyclically-occurring phenomena in a reciprocating mechanism, the combination of: a first means for translating one of said phenomena into a corresponding electric variation; a second means for translating another of said phenomena into a corresponding electric variation; electronic means providing an electronic beam directed toward a receptive surface and including a pair of circuits adapted respectively to deflect said electronic beam in directions at right angles to each other; means connected to one of said circuits for repeatedly moving said electronic beam across said receptive surface in one of said directions at a frequency independent of the frequency of reciprocation of said mechanism, said means providing an adjustable means for adjusting the frequency of such movement of said electronic beam to a frequency near the frequency of reciprocation of said mechanism irrespective of input from said first or second means; synchronizing means for starting each of said movements of said beam when said reciprocating mechanism assumes a predetermined position in its cycle; and switch means for sequentially connecting said first and second means to the other of said circuits to apply said electric variations thereto in a manner to deflect said beam under the influence of both said circuits to sweep out successive curves in the same general area of said receptive surface.

4. A combination as defined in claim 3, in which said synchronizing means includes a movable armature reciprocating with said mechanism, a magnetic circuit providing a space to receive said movable armature, and means responsive to a change in reluctance of said magnetic circuit when said armature changes its position with respect to said space for starting each of said movements of said beam in said one direction, said last means including a control winding coupled with said magnetic circuit.

5. In a device for indicating or measuring a plurality of cyclically-occurring phenomena in a reciprocating mechanism, the combination of: a first means for translating one of said phenomena into a corresponding electric variation; a second means for translating another of said phenomena into a corresponding electric variation; electronic means providing an electronic beam directed toward a receptive surface and including a pair of circuits adapted respectively to deflect said electronic beam in directions at right angles to each other; electromagnetic means for creating electric impulses in timed relationship with the reciprocations of said mechanism, said means including a movable armature reciprocating with said mechanism and means providing a magnetic circuit and an armature-receptive space therein and means including a winding linked with said magnetic circuit whereby the reluctance of said winding changes suddenly when said armature enters and leaves said space to establish said electric impulses; means triggered by said impulses and connected to one of said circuits to deflect said electronic beam to move across said receptive surface; a sequence switch adapted when in one position to connect said first means to the other of said circuits and when in another position to connect said second means to said other of said circuits; a step-by-step operating means for moving said sequence switch from one position to the other; and means for moving said operating means step by step in response to said electric impulses.

6. In a device for indicating a cyclically-occurring phenomenon in a reciprocating mechanism, the combination of: means for translating said phenomenon into a corresponding electric variation; electronic means providing a receptive surface and an electronic beam directed toward said receptive surface, said electronic means including a pair of circuits adapted respectively to deflect said electronic beam along coordinate axes; means for impressing said electric variation on one of said circuits to deflect said electronic beam in a direction along one of said coordinate axes in response to said cyclically-occurring phenomenon; a condenser; means for progressively increasing the potential across said condenser with the passage of time; means for impressing on the other of said circuits a potential substantially proportional to the potential across said condenser to deflect said electronic beam in a direction parallel with the other of said coordinate axes; a time-base electronic tube providing tube elements comprising a biased grid; circuit means for connecting said tube elements to said condenser to apply the increasing condenser voltage to said tube elements in such manner that the tube will fire to discharge said condenser when such applied voltage overcomes the bias of said grid; an electronic control tube providing a control grid, an anode, and a cathode; a grid circuit connecting said control grid and said cathode; electric synchronizing means in said grid circuit for changing the potential on said control grid each time said reciprocating mechanism assumes a given position in its cycle of motion, thereby changing the potential of said anode; and means for connecting said anode to said biased grid of said time-base tube to change the potential of said biased grid of said time-base tube to discharge said condenser when said reciprocating mechanism is in said given position in its cycle of operation.

RICARDO MESTAS.